United States Patent [19]
Kaji et al.

[11] Patent Number: 5,068,293
[45] Date of Patent: Nov. 26, 1991

[54] NAPHTHOL-BASED EPOXY RESINS, INTERMEDIATES FOR THE SAME, PROCESS FOR PREPARING THE SAME, AND EPOXY RESIN COMPOSITIONS CONTAINING THE SAME

[75] Inventors: Masashi Kaji, Kitakyushu; Takanori Aramaki, Fukuoka; Norito Nakahara; Yasuharu Yamada, both of Kitakyushu, all of Japan

[73] Assignee: Nippon Steel Chemical Co., Ltd., Tokyo, Japan

[21] Appl. No.: 575,022

[22] Filed: Aug. 30, 1990

[30] Foreign Application Priority Data

Sep. 1, 1989 [JP] Japan .................. 1-224520

[51] Int. Cl.$^5$ .............. C08G 59/00; C08G 65/08; C08G 65/14
[52] U.S. Cl. ................... 525/534; 528/97; 528/212; 549/546; 549/547; 549/560; 568/717; 568/719; 568/736
[58] Field of Search ........... 525/534; 528/212, 97; 549/560

[56] References Cited

U.S. PATENT DOCUMENTS

| | | | |
|---|---|---|---|
| 4,551,508 | 11/1985 | Urasaki | 528/97 |
| 4,908,424 | 3/1990 | Dewhirst et al. | 528/97 |

FOREIGN PATENT DOCUMENTS

63-238122 4/1988 Japan .

*Primary Examiner*—Earl Nielsen
*Assistant Examiner*—Frederick Krass

*Attorney, Agent, or Firm*—Armstrong, Nikaido, Marmelstein, Kubovcik & Murray

[57] ABSTRACT

The invention relates to naphthol-based epoxy resins of the general formula (I)

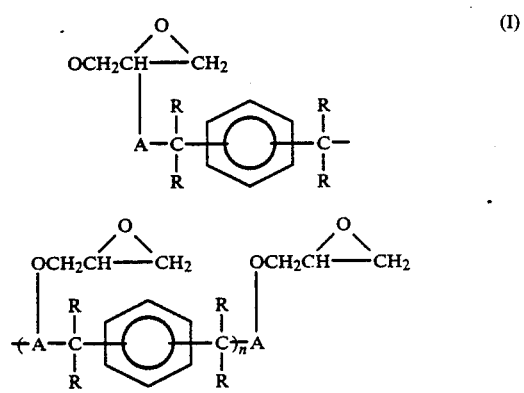

in which A is a naphthalene nucleus, R is hydrogen or methyl, and n is an integer from 0 to 15, naphthol aralkyl resins which are intermediates for said epoxy resins, a process for the preparation of said naphthol aralkyl resins, and epoxy resin compositions containing said naphthol-based epoxy resins which are highly heat- and moisture-resistant, possess excellent impact strength and other mechanical properties, and are useful for such applications as lamination, molding, casting, and adhesion.

2 Claims, 6 Drawing Sheets

NAPHTHOL-BASED EPOXY RESINS, INTERMEDIATES FOR THE SAME, PROCESS FOR PREPARING THE SAME, AND EPOXY RESIN COMPOSITIONS CONTAINING THE SAME

FIELD OF THE INVENTION AND RELATED ART STATEMENT

This invention relates to naphthol-based epoxy resins curable into water- and moisture-resistant products of excellent mechanical strength, to naphthol aralkyl resins which are intermediates for said naphthol-based epoxy resins, to a process for preparing said naphthol-based epoxy resins, and to epoxy resin compositions containing said naphthol-based epoxy resins.

In recent years, progress in the area of advanced materials has created a need for base resins of higher performance. For example, higher heat and moisture resistance than currently available is in strong demand for epoxy resin matrixes in composite materials intended for the aircraft and space industries.

None of the epoxy resins known to date, however, meets such requirements. For instance, the well-known bisphenol A-based epoxy resins are used widely as their being liquid at ambient temperature makes them easy to work with and facilitates their mixing with curing agents and additives. They offer no solutions, however, to the problems of heat and moisture resistance. On the other hand, phenol novolak epoxy resins are known for their improved heat resistance, but they are not satisfactory in respect to moisture and impact resistance. Epoxy resins based on phenol aralkyl resins have been proposed in Japan Tokkyo Kokai Koho No. 63-238,122 (1988) with the objective of improving the impact resistance, but they are not satisfactory as far as the heat and moisture resistance is concerned.

OBJECT AND SUMMARY OF THE INVENTION

It is therefore an object of this invention to provide naphthol-based epoxy resins which are highly resistant to heat and moisture, possess excellent mechanical properties such as impact resistance, and are useful for a variety of applications such as lamination, molding, casting, and adhesion.

Another object of this invention is to provide intermediates for the preparation of the naphthol-based epoxy resins of the aforesaid broad usefulness.

A further object of this invention is to provide a process for preparing the naphthol-based epoxy resins of broad usefulness.

A still further object of this invention is to provide epoxy resin compositions which contain the aforesaid naphthol-based epoxy resins, are highly resistant to heat and moisture, possess excellent mechanical properties such as impact resistance, and are useful for a variety of applications such as lamination, molding, casting, and adhesion.

Accordingly, this invention relates to naphthol-based epoxy resins of the following general formula (I)

in which A is a naphthalene nucleus, R is hydrogen or methyl, and n is an integer from 0 to 15.

This invention also relates to naphthol aralkyl resins of the following general formula (II)

in which A is a naphthalene nucleus, R is hydrogen or methyl, and n is an integer from 0 to 15.

This invention further relates to a process for preparing naphthol-based epoxy resins which comprises treating 1 mole of naphthol with 0.1 to 0.9 mole of a condensing agent of the following general formula (III)

in which R is hydrogen or methyl and R' is hydrogen or a hydrocarbon radical with 1 to 4 carbon atoms to form naphthol aralkyl resins of the following general formula (II)

in which A is a naphthalene nucleus, R is hydrogen or methyl, and n is an integer from 0 to 15 and treating said naphthol aralkyl resins with epichlorohydrin.

The naphthol aralkyl resins of the aforesaid general formula (II) can be prepared by the reaction of 1-naphthol or 2-naphthol or a mixture thereof with a condensing agent of the aforesaid formula (III) consisting of a dialcohol or its ether. The condensing agent may be an o-, m-, or p-isomer, preferably m- or p-isomer. Examples of such condensing agents are p-xylylene glycol, $\alpha$, $\alpha'$-dimethoxy-p-xylene, $\alpha$, $\alpha'$-diethoxy-p-xylene, $\alpha$, $\alpha'$-di-n-propoxy-p-xylene, $\alpha$, $\alpha'$-diisopropoxy-p-xylene, 1,4-di(2-hydroxy-2-propyl)benzene, 1,4-di(2-methoxy-2-propyl)benzene, 1,4-di(2-ethoxy-2-propyl)benzene, 1,4-di(2-n-propoxy-2-propyl)benzene, and 1,4-di(2-isopropoxy-2-propyl)benzene.

The mole ratio of naphthol to the condensing agent is 1 mole of the former to 1 mole or less, preferably 0.1 to 0.9 mole, of the latter. With less than 0.1 mole of the condensing agent, more naphthol remains unchanged which makes it difficult to purify the resins. On the other hand, the use of more than 0.9 mole enhances the softening point of the resins and makes the resins difficult to work with in some of their applications. It is desirable to keep the integer n at 15 or less in the general formula (II).

The reaction of naphthol with the condensing agent to yield the naphthol aralkyl resins is carried out in the presence of an acid catalyst. This catalyst may be suitably chosen from the known inorganic and organic acids. Examples are mineral acids such as hydrochloric acid, hydrofluoric acid, phosphoric acid, and sulfuric acid, organic acids such as formic acid, oxalic acid, trifuoroacetic acid, and p-toluenesulfonic acid, and Lewis acids and solid acids such as zinc chloride and aluminum chloride.

The reaction in question is normally carried out at 10° to 250° C. for 1 to 20 hours. It is allowable to use a solvent in the reaction. Examples of the solvents are alcohols such as methanol, ethanol, propanol, butanol, ethylene glycol, diethylene glycol, Methyl Cellosolve, and Ethyl Cellosolve and aromatic hydrocarbons such as benzene, toluene, chlorobenzene, and dichlorobenzene.

The naphthol aralkyl resins of this invention thus obtained are useful as intermediates for epoxy resins and also as curing agents for epoxy resins. When applied as curing agents, they give cured epoxy resins with improved mechanical properties, in particular improved toughness and moisture resistance, compared with the conventional phenol novolak curing agents.

The naphthol-based epoxy resins of this invention are prepared by the reaction of epichlorohydrin with the naphthol aralkyl resins of the aforesaid general formula (II). This reaction can be carried out like the usual epoxidation reaction.

For instance, the naphthol aralkyl resins of the aforesaid general formula (II) are dissolved in an excess of epichlorohydrin and the solution is allowed to react in the presence of an alkali metal hydroxide such as potassium hydroxide at 50° to 150° C., preferably 60° to 120° C., for 1 to 10 hours. The amount of epichlorohydrin here ranges from 2 to 15 times, preferably from 2 to 10 times, the number of mole of the naphthol nucleus while that of the alkali metal hydroxide ranges from 0.8 to 1.2 times, preferably 0.9 to 1.1 times, the number of mole of the naphthol nucleus.

Upon completion of the reaction, the excess epichlorohydrin is distilled off, the remainder is dissolved in a solvent such as methyl isobutyl ketone, the solution is filtered, and the filtrate is washed with water to remove the inorganic salts and then stripped of the solvent by distillation to yield the desired epoxy resins.

The epoxy resins thus prepared are mixed with curing agents and curing accelerators and cured by heating to give products of good properties. The curing agents include polyhydric phenols such as phenol novolaks, cresol novolaks, and poly(hydroxyphenyl)ethane, aromatic amines such as phenylenediamine, diaminodiphenylmethane, diaminodiphenyl sulfone, and diaminodiphenyl ether, and acid anhydrides such as phthalic anhydride, hexahydrophthalic anhydride, nadic methyl anhydride, pyromellitic anhydride, and benzophenonetetracarboxylic acid anhydride. The curing accelerators include triphenylphosphine, imidazole, and 1,8-diazabicyclo[5,4,0]undecene-1.

The epoxy resins of this invention can be cured by the addition of the aforesaid curing agents and curing accelerators or, as needed, by further addition of fillers such as powders of fused silica, powders of crystalline silica, talc, alumina, calcium carbonate, and glass fibers. The resins may be reinforced with high-modulus fibers such as carbon fibers and aramid fibers.

The epoxy resins and their intermediates, namely the naphthol aralkyl resins, of this invention are useful for the preparation of epoxy resin compositions which are curable into products of excellent resistance to heat, moisture, and impact and are expected to find their way into a variety of applications.

DETAILED DESCRIPTION OF THE PREFERRED EMBODIMENTS

This invention will be explained in detail with reference to the accompanying examples and comparative examples.

EXAMPLE 1

In a 500-ml. three-necked flask was placed a solution of 144 g. (1.0 mole) of 1-naphthol and 69 g. (0.5 mole) of p-xylylene glycol in 120 ml. of 1-butanol, 25 ml. of water and 9.5 g. of concentrated hydrochloric acid were added, and the mixture was allowed to react with stirring at 95° to 98° C. for 3 hours. The reaction mixture was neutralized with a dilute aqueous sodium hydroxide solution, washed with water, distilled to drive off the 1-butanol, and then steam-distilled to remove the unchanged 1-naphthol and give 132 g. of a naphthol aralkyl resin which was an intermediate for epoxy resins. The resin thus obtained showed a hydroxyl equivalent of 222 and a softening point of 105° C. as determined according to JIS K 2548.

Figure 1:
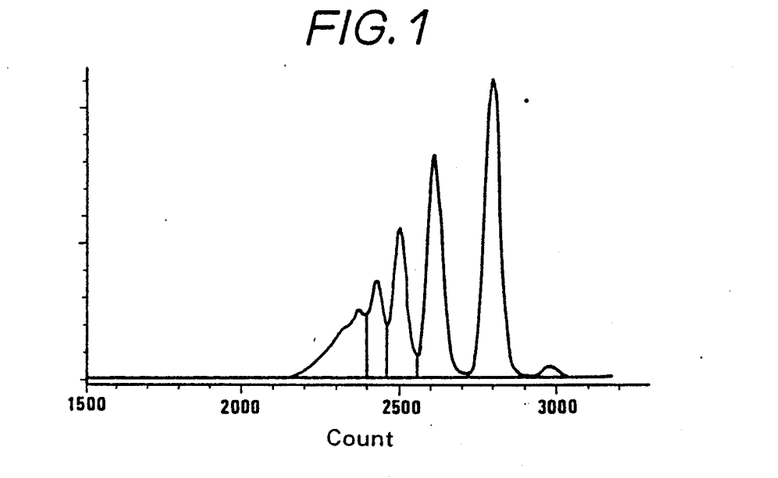
FIGS. 1 and 2 are respectively the gel permeation chromatogram and infrared absorption spectrum of the resin obtained in Example 1.
Figure 2:
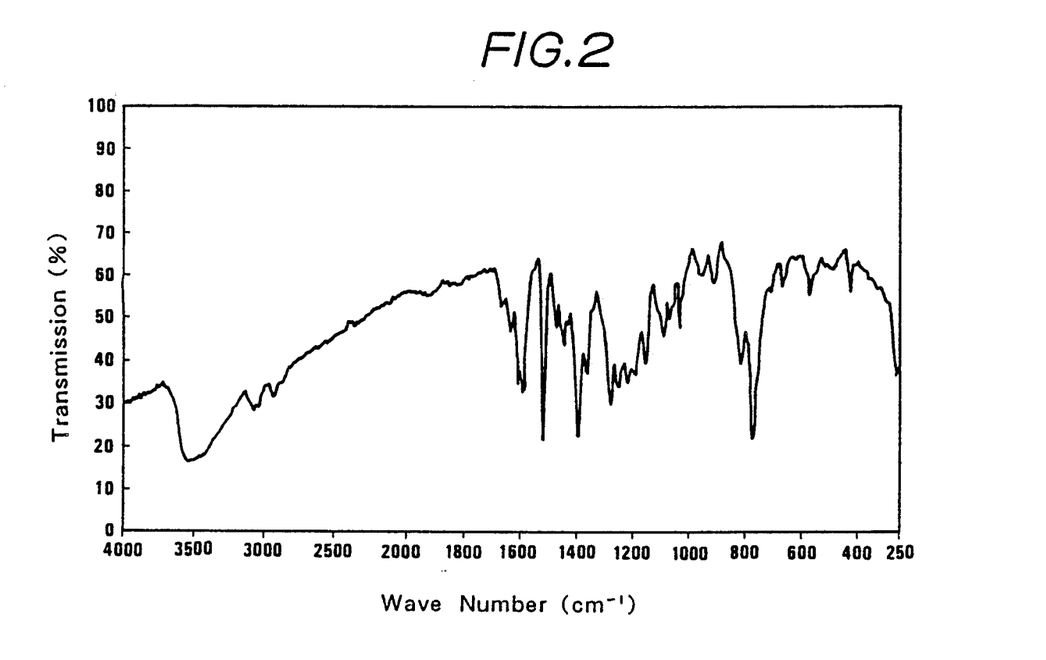

Measurements by gel permeation chromatography and infrared absorption spectroscopy were made on the resin and the results are shown in FIGS. 1 and 2.

EXAMPLE 2

Figure 3:
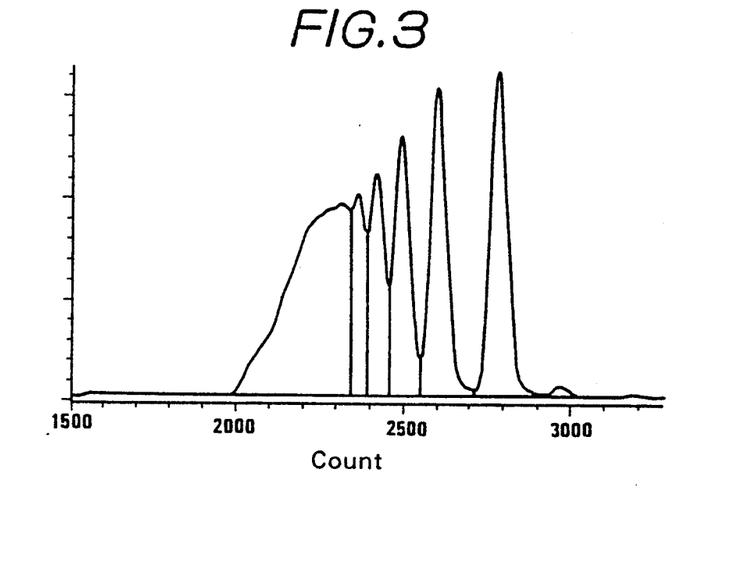
FIG. 3 is the gel permeation chromatogram of the resin obtained in Example 2.

The reaction was carried out as in Example 1 with the use of 96 g. (0.67 mole) of 1-naphthol and 69 g. (0.5 mole) of p-xylylene glycol to give 116 g. of a naphthol aralkyl resin with a hydroxyl equivalent of 234 and a softening point of 130° C. The gel permeation chromatogram of the resin is shown respectively in FIG. 3.

EXAMPLE 3

Figure 4:
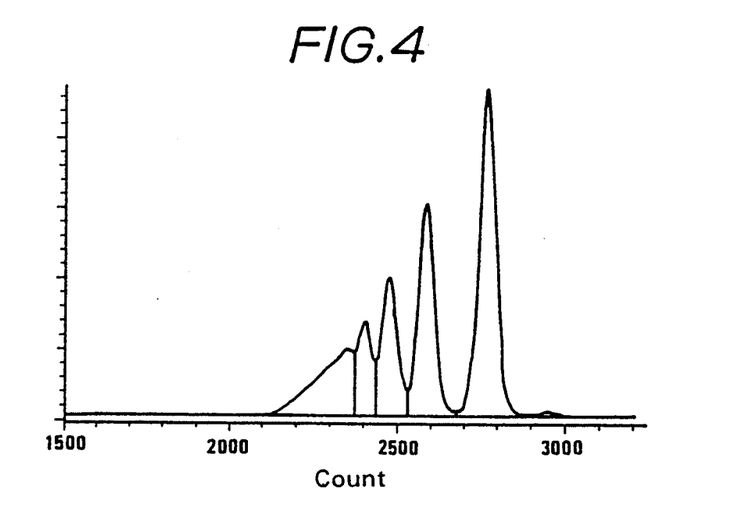
FIGS. 4 and 5 are respectively the gel permeation chromatogram and infrared absorption spectrum of the resin obtained in Example 3.
Figure 5:
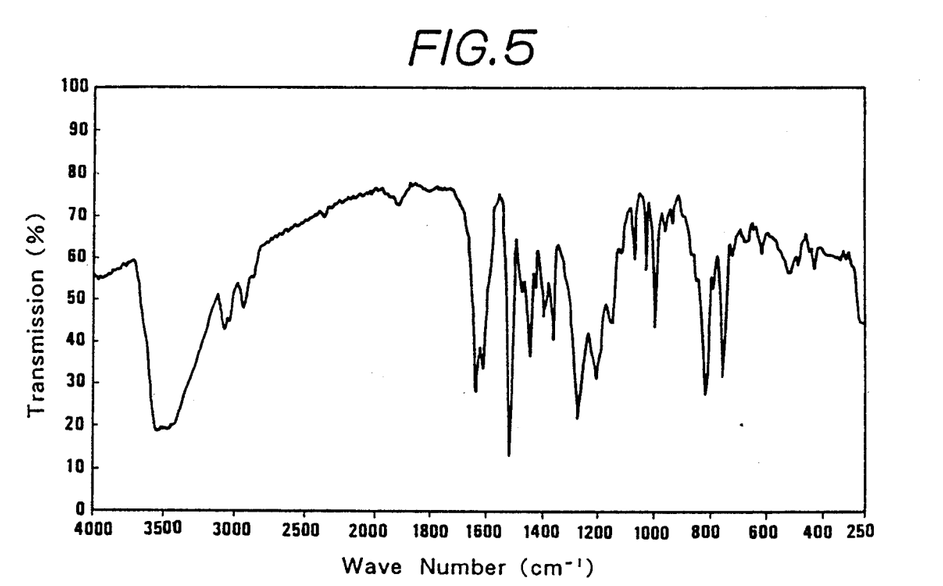

With the exception of using 2-naphthol, the reaction was carried out exactly as in Example 1 to give 127.5 g. of a naphthol aralkyl resin with a hydroxyl equivalent of 225 and a softening point of 114° C. The gel permeation chromatogram and infrared absorption spectrum of the resin are shown respectively in FIGS. 4 and 5.

EXAMPLE 4

A mixture of 144 g. (1.0 mole) of 2-naphthol and 46 g. (0.33 mole) of p-xylylene glycol was heated at 130° C. to form a solution, 0.7 g. of p-toluenesulfonic acid was added, and the resulting mixture was allowed to react at 130° C. for 2 hours. The reaction mixture was then neutralized with a sodium carbonate solution and steam-distilled to remove the unchanged 2-naphthol and give 69 g. of a naphthol aralkyl resin with a hydroxyl equivalent of 212 and a softening point of 103° C.

EXAMPLE 5

A mixture of 108 g. (0.75 mole) of 2-naphthol, 69 g. (0.5 mole) of p-xylylene glycol, and 5.4 g. of oxalic acid was allowed to react at 150° C. for 6 hours with the removal of water of reaction from the system.

The mixture was then steam-distilled to remove the unchanged 2-naphthol and give 119 g. of a naphthol aralkyl resin with a hydroxyl equivalent of 223.5 and a softening point of 136° C.

EXAMPLE 6

In a 3-1. flask were placed 430.3 g. (3.4 moles) of 1-naphthol, 329.8 g. (1.7 moles) of 1,4-di(2-hydroxy-2-propyl)benzene, and 1,600 ml. of toluene, 4.95 g. of p-toluenesulfonic acid was further added, and the mixture was allowed to react under reflux for 5 hours. Thereafter, about 1 l. of toluene was distilled off, the remainder was cooled to room temperature, and the crystals formed were collected by filtration and recrystallized from toluene to give 560 g. of white crystals with a melting point of 238° C.

The crystals thus obtained were identified as those of the desired 1,4-di[2-(1-hydroxy-2-naphthyl)-2-propyl]benzene on the basis of the H-NMR spectroscopic data shown in Table 1.

TABLE 1

| H-NMR Spectral peaks (solvent; CDCl$_3$) | |
|---|---|
| 1.75(12H, s) | 4.87(2H, s) |
| 7.59(4H, s) | 7.40–7.45(4H, m) |
| 7.48(2H, d; J=8.55 Hz) | 7.63(2H, d; J=8.78 Hz) |
| 7.77(2H, d; J=7.32 Hz) | 8.10(2H, d; J=7.33 Hz) |

EXAMPLE 7

Figure 6:
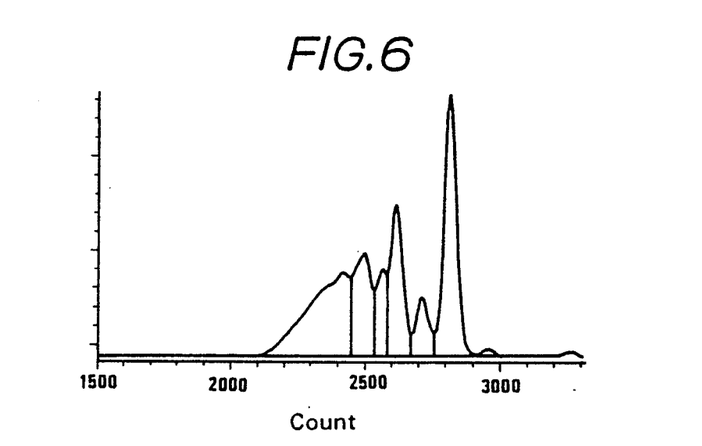
FIGS. 6 and 7 are respectively the gel permeation chromatogram and infrared absorption spectrum of the resin obtained in Example 7.
Figure 7:
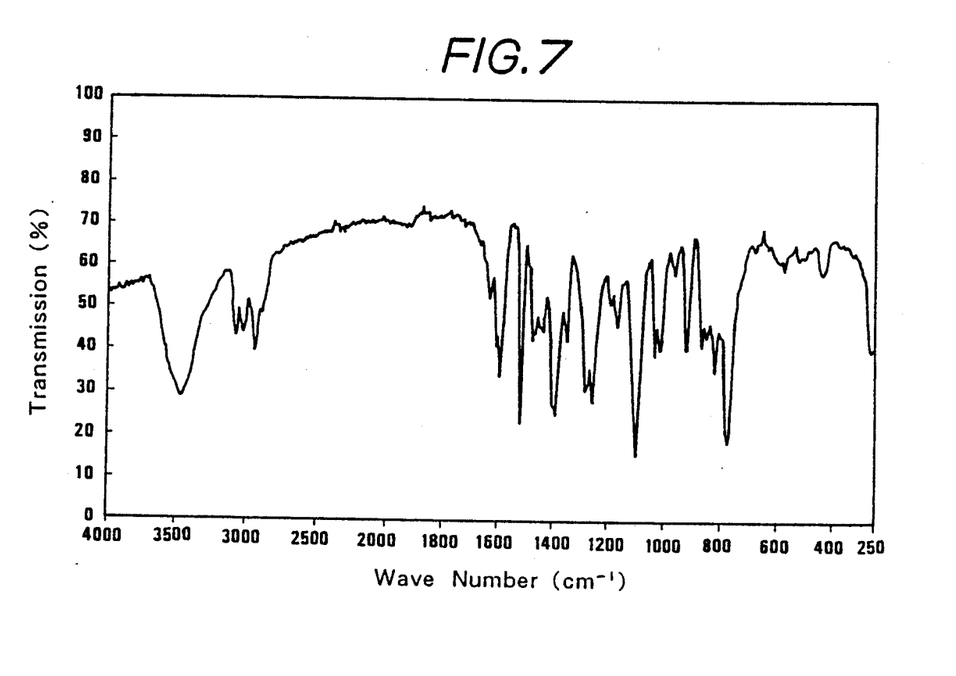

In 600 g. of epichlorohydrin was dissolved 100 g. of the naphthol aralkyl resin obtained in Example 1, 37.5 g. of a 48% aqueous sodium hydroxide solution was added in drops in 3.5 hours at 113° to 117° C. In the meantime, water of reaction was removed from the system by azeotropic distillation with epichlorohydrin and the distilled epichlorohydrin was returned to the system. Upon completion of the addition, the reaction was allowed to proceed for additional 15 minutes, the epichlorohydrin was distilled off, the residue was extracted with methyl isobutyl ketone, the extract was washed with water, and the methyl isobutyl ketone was distilled off to recover 122 g. of an epoxy resin. The resin showed an epoxy equivalent of 316, a softening point of 90° C., and a melt viscosity of 6.0 P at 150° C. The gel permeation chromatogram and infrared absorption spectrum of the resin in question are shown respectively in FIGS. 6 and 7.

An epoxy resin composition was prepared by mixing 100 parts of the epoxy resin thus obtained with a phenol novolak (curing agent) and triphenylphosphine (curing accelerator) at ratios shown in Table 2 and molded at 150° C. and specimens from the cured product were tested for a variety of properties. The results are shown in Table 2.

The glass transition temperature and the linear expansion coefficient were measured with the aid of a thermomechanical analyzer at a test speed of 7° C./min. The flexural strength and the flexural modulus were determined in accordance with JIS K 6911. The moisture absorption was determined after allowing the specimen to absorb moisture at 133° C. and 3 atmospheres for 100 hours. The fracture toughness was determined in accordance with a method described by A. F. Yee and R. A. Pearson in Journal of Materials Science, 21, 2462 (1986).

EXAMPLE 8

Figure 8:
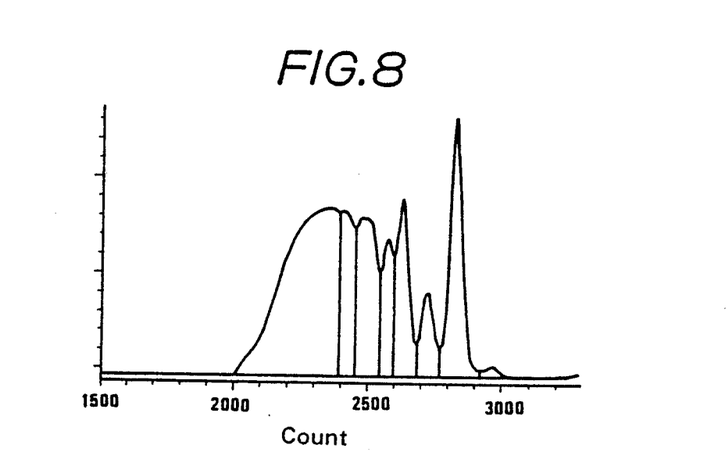
FIG. 8 is the gas permeation chromatogram of the epoxy resin obtained in Example 8.

In 600 g. of epichlorohydrin was dissolved 100 g. of the naphthol aralkyl resin obtained in Example 2, 35.6 g. of a 48% aqueous sodium hydroxide solution was added in drops at 113° to 117° C. as in Example 6 to effect the epoxidation reaction, which gave 116 g. of an epoxy resin with an epoxy equivalent of 335 and a softening point of 104° C. The gel permeation chromatogram of the epoxy resin is shown in FIG. 8.

The epoxy resin was cured as in Example 7 and tested for the properties. The results are shown in Table 2.

EXAMPLE 9

Figure 9:
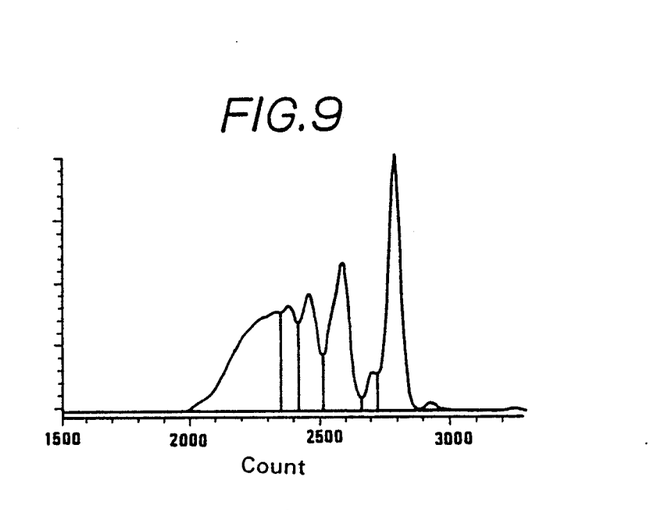
FIGS. 9 and 10 are respectively the gel permeation chromatogram and infrared absorption spectrum of the epoxy resin obtained in Example 9.
Figure 10:
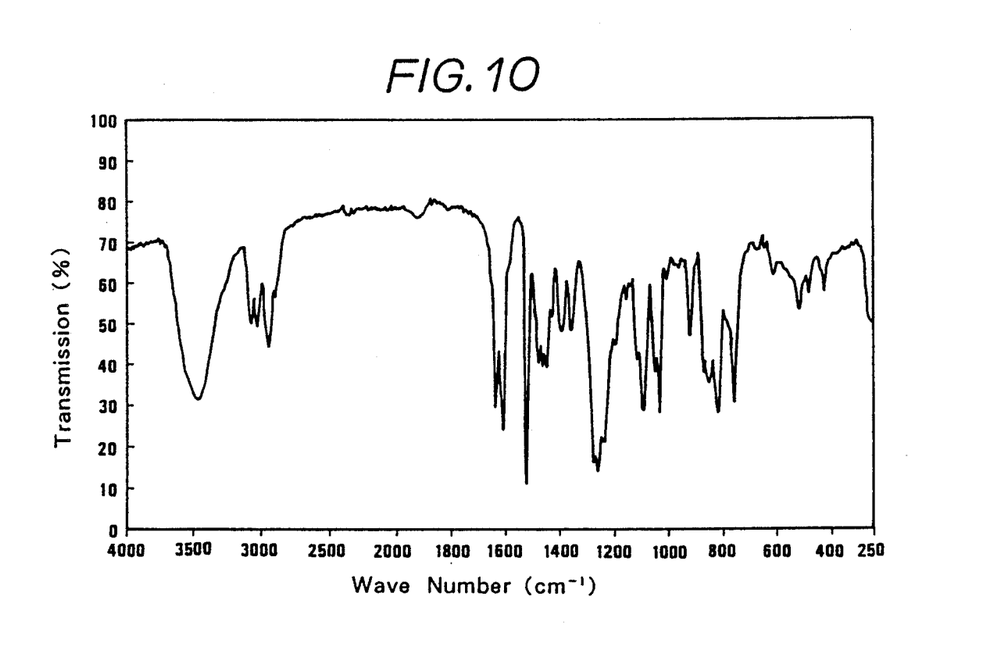

In 600 g. of epichlorohydrin was dissolved 100 g. of the naphthol aralkyl resin obtained in Example 5, 36.2 g. of a 48% aqueous sodium hydroxide solution was added in drops at 70° C. as in Example 7 to effect the epoxidation reaction, which gave 119 g. of an epoxy resin with an epoxy equivalent of 333 and a softening point of 100.5° C. The gas permeation chromatogram and infrared absorption spectrum of the epoxy resin are shown respectively in FIGS. 9 and 10.

The epoxy resin was cured as in Example 7 and tested for the properties. The results are shown in Table 2.

EXAMPLE 10

In 740 g. of epichlorohydrin was dissolved 90 g. of 1,4-di[2-(1-hydroxy-2-naphthyl)-2-propoyl]benzene and 33.6 g. of a 48 wt. % aqueous sodium hydroxide solution was added in 3.5 hours at 115° C. In the meantime, water was removed from the system by azeotropic distillation with epichlorhydrin and the distilled epichlorohydrin was returned to the system. The reaction was allowed to proceed for additional 15 minutes after the addition of the aqueous sodium hydroxide solution.

Figure 11:
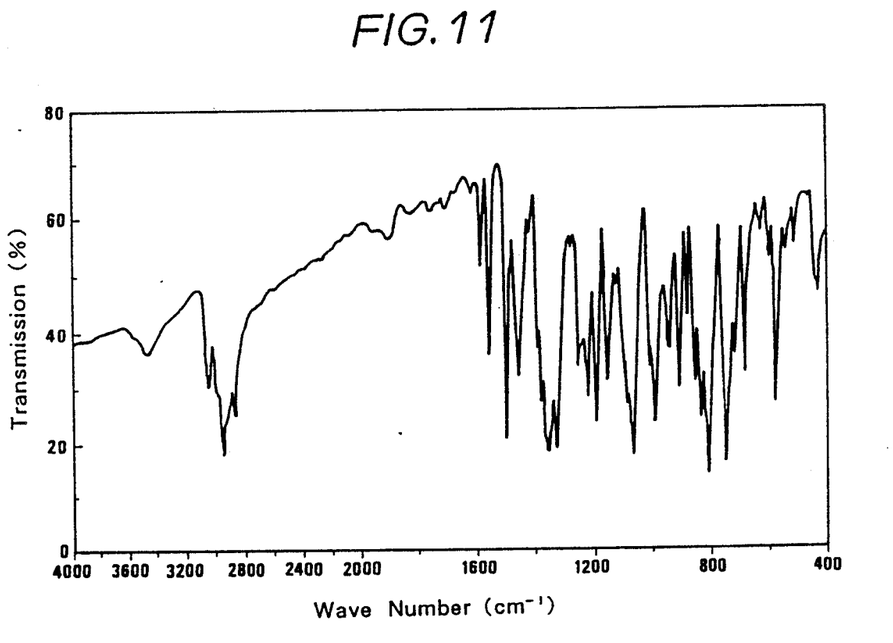
FIG. 11 is the infrared absorption spectrum of the epoxy resin obtained in Example 10.

Upon completion of the reaction, the epichlorohydrin was distilled off under reduced pressure and the residue was extracted with methyl isobutyl ketone to give 106 g. of an epoxy resin with an epoxy equivalent of 324 and a softening point of 114° C. The infrared absorption spectrum of the epoxy resin is shown in FIG. 11.

SUPPLEMENTARY EXAMPLE 1

An epoxy resin composition was formulated from the naphthol aralkyl resin obtained in Example 5 as curing agent, an o-cresol novolak epoxy resin, and triphenylphosphine (curing agent) at the ratio shown in Table 2, cured as in Example 7, and tested for the properties. The results are shown in Table 2.

COMPARATIVE EXAMPLES 1-2

The test specimens were prepared as in Example 7 from a liquid bisphenol A-based epoxy resin (Comparative Example 1) or an o-cresol novolak epoxy resin (Comparative Example 2) and tested for the properties. The results are shown in Table 2.

TABLE 2

|  |  | Example | | | Supplementary example | Comparative example | |
|---|---|---|---|---|---|---|---|
|  |  | 7 | 8 | 9 | 1 | 1 | 2 |
| Recipe (Parts by weight) | | | | | | | |
| Epoxy resin | | 100 | 100 | 100 | 100 | 100 | 100 |
| Curing agent | | 33 | 31 | 31 | 114 | 56 | 53 |
| Curing accelerator | | 2 | 2 | 2 | 3 | 2 | 2 |
| Properties | | | | | | | |
| Glass transition temperature (°C.) | | 160 | 164 | 157 | 161 | 130 | 165 |
| Linear expansion coefficient ($\times 10^{-5} \cdot °C.^{-1}$) | <Tg | 5.3 | 5.4 | 5.4 | 5.7 | 6.0 | 6.3 |
|  | >Tg | 17.2 | 17.1 | 16.3 | 16.7 | 17.5 | 16.4 |
| Flexural strength (kg/mm$^2$) | | 8.0 | 9.0 | 9.5 | 8.5 | 8.0 | 10.0 |
| Flexural modulus (kg/mm$^2$) | | 350 | 345 | 320 | 325 | 280 | 320 |
| Moisture absorption (wt %) | | 1.4 | 1.4 | 1.4 | 1.5 | 2.3 | 2.0 |
| Fracture toughness (MPa · m½) | | 0.80 | 0.83 | 0.86 | 0.78 | 0.79 | 0.64 |

What is claimed is:

1. Naphthol-based epoxy resins of the general formula (I)

(I)

in which A is a naphthalene nucleus, R is hydrogen or methyl, and n is an integer from 0 to 15.

2. An epoxy resin composition comprising
   (a) naphthol-based epoxy resins of the general formula (I)

(I)

in which A is a naphthalene nucleus, R is hydrogen or methyl, and n is an integer from 0 to 15,
   (b) a curing agent, and
   (c) a curing accelerator.

* * * * *